(12) United States Patent
Womack

(10) Patent No.: US 9,606,292 B2
(45) Date of Patent: Mar. 28, 2017

(54) BRANCHING DEVICE FOR FIBER OPTIC CIRCUITS

(71) Applicants: PGS Geophysical AS, Oslo (NO); Willard Womack, Austin, TX (US)

(72) Inventor: Willard Womack, Austin, TX (US)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 15/027,133

(22) PCT Filed: Dec. 3, 2015

(86) PCT No.: PCT/US2015/063699
§ 371 (c)(1),
(2) Date: Apr. 4, 2016

(87) PCT Pub. No.: WO2016/099927
PCT Pub. Date: Jun. 23, 2016

(65) Prior Publication Data
US 2016/0327740 A1    Nov. 10, 2016

Related U.S. Application Data

(60) Provisional application No. 62/093,177, filed on Dec. 17, 2014.

(51) Int. Cl.
*G02B 6/00* (2006.01)
*G02B 6/42* (2006.01)
(Continued)

(52) U.S. Cl.
CPC ............ *G02B 6/125* (2013.01); *G01D 5/353* (2013.01); *G01H 9/004* (2013.01); *G01V 1/20* (2013.01);
(Continued)

(58) Field of Classification Search
CPC ............ G02B 6/02033; G02B 6/02076; G02B 6/12004; G02B 6/12016; G02B 6/1228;
(Continued)

(56) References Cited

U.S. PATENT DOCUMENTS 6,366,390 B1    4/2002  King et al.
6,408,119 B1 *  6/2002  Meltz ................... G02B 6/2835
                                                    385/31
(Continued)

FOREIGN PATENT DOCUMENTS

WO    03/098156      11/2003
WO    2012/082796    6/2012

OTHER PUBLICATIONS

PCT Search Report and Written Opinion, Application No. PCT/US2015/063699, mailed Mar. 23, 2016.
(Continued)

*Primary Examiner* — Akm Enayet Ullah
*Assistant Examiner* — Michael Mooney

(57) ABSTRACT

Example devices are optical dividers including: a first optical coupler; a second optical coupler; and a third optical coupler. The devices also comprise a first optical fiber integrated in the first optical coupler, the first optical fiber coupled to an optical combiner, and a second optical fiber integrated in the first optical coupler and in the second optical coupler, the second optical fiber coupled to the optical combiner. The devices further comprise a third optical fiber integrated in the second optical coupler and in the third optical coupler, the third optical fiber coupled to the optical combiner. The optical combiner includes: a first output coupler; a second output coupler; and the optical combiner couples a subset of the first through third optical (Continued)

fibers to the first output coupler; and the optical combiner couples a subset of the first through third optical fibers to the second output coupler.

19 Claims, 3 Drawing Sheets

(51) Int. Cl.

| | |
|---|---|
| *G02B 6/125* | (2006.01) |
| *G01H 9/00* | (2006.01) |
| *G01V 1/20* | (2006.01) |
| *G02B 6/36* | (2006.01) |
| *G02B 6/28* | (2006.01) |
| *G01D 5/353* | (2006.01) |
| *G01V 8/24* | (2006.01) |
| *G02B 6/02* | (2006.01) |
| *G02B 6/12* | (2006.01) |
| *G02B 6/122* | (2006.01) |
| *G02B 6/30* | (2006.01) |

(52) U.S. Cl.
CPC ........... *G01V 8/24* (2013.01); *G02B 6/02033* (2013.01); *G02B 6/02076* (2013.01); *G02B 6/12004* (2013.01); *G02B 6/12016* (2013.01); *G02B 6/1228* (2013.01); *G02B 6/2804* (2013.01); *G02B 6/2813* (2013.01); *G02B 6/30* (2013.01); *G02B 6/3608* (2013.01); *G01V 2210/1427* (2013.01)

(58) Field of Classification Search
CPC .... G02B 6/125; G02B 6/2813; G02B 6/2835; G02B 6/30; G02B 6/3608; G01D 5/353; G01V 1/20; G01V 8/24
USPC ...................... 385/12–13, 37, 39, 43, 45, 48
See application file for complete search history.

(56) References Cited

U.S. PATENT DOCUMENTS

| | | |
|---|---|---|
| 7,688,673 B2 | 3/2010 | Ronnekleiv et al. |
| 2002/0106149 A1 | 8/2002 | Tehrani |
| 2003/0123781 A1 | 7/2003 | Rockwell et al. |
| 2004/0239940 A1 | 12/2004 | Gurunathan et al. |
| 2008/0112261 A1 | 5/2008 | Ronnekleiv et al. |
| 2012/0067118 A1 | 3/2012 | Hartog et al. |
| 2013/0183003 A1 | 7/2013 | Cairns |
| 2014/0046599 A1 | 2/2014 | Smith et al. |
| 2014/0112094 A1 | 4/2014 | Fernihough |
| 2014/0140655 A1* | 5/2014 | Chakravarty .......... B82Y 20/00 385/12 |
| 2014/0312903 A1 | 10/2014 | Olsson et al. |
| 2014/0339411 A1 | 11/2014 | Lagace et al. |

OTHER PUBLICATIONS

Fu, Yunfei et al: "Efficient adiabatic silicon-on-insulator waveguide taper", Photon. Res., Jun. 2014, vol. 2, No. 3.

Karppinen, Mikko et al: "Multiplayer Single-mode Polylmeric Waveguides by imprint patterning for optical interconnects", VTT Technical Research Centre of Finland, Feb. 2014.

* cited by examiner

BRANCHING DEVICE FOR FIBER OPTIC CIRCUITS

CROSS-REFERENCE TO RELATED APPLICATIONS

This application claims the benefit of U.S. Provisional Application Ser. No. 62/093,177 filed Dec. 17, 2014 and titled "Branching Device for Fiber Optic Circuits". The provisional application is incorporated by reference herein as if reproduced in full below.

BACKGROUND

Permanent hydrocarbon reservoir monitoring is a technique where multiple three-dimensional seismic "pictures" of the state of a hydrocarbon reservoir are taken such that a geologist or reservoir engineer may plan the location of additional boreholes for increasing the efficiency of the hydrocarbon extraction and/or may assess the efficiency of the current extraction techniques over time. In some cases, taking multiple seismic pictures of a hydrocarbon reservoir may be referred to as four-dimensional (4D) seismic.

Marine-based permanent reservoir monitoring faces significant challenges that are not faced by land-based permanent monitoring systems. This is particularly true of ocean bottom installations as water depths extend into the 1000 meter range and beyond. In particular, components comprising the sensors and associated data communication systems disposed on the sea floor may be exposed to sea water, high humidity and condensation, and subject to hydrostatic stresses arising in the marine environment.

BRIEF DESCRIPTION OF THE DRAWINGS

For a detailed description of exemplary embodiments, reference will now be made to the accompanying drawings in which.

DEFINITIONS

Figure 1:
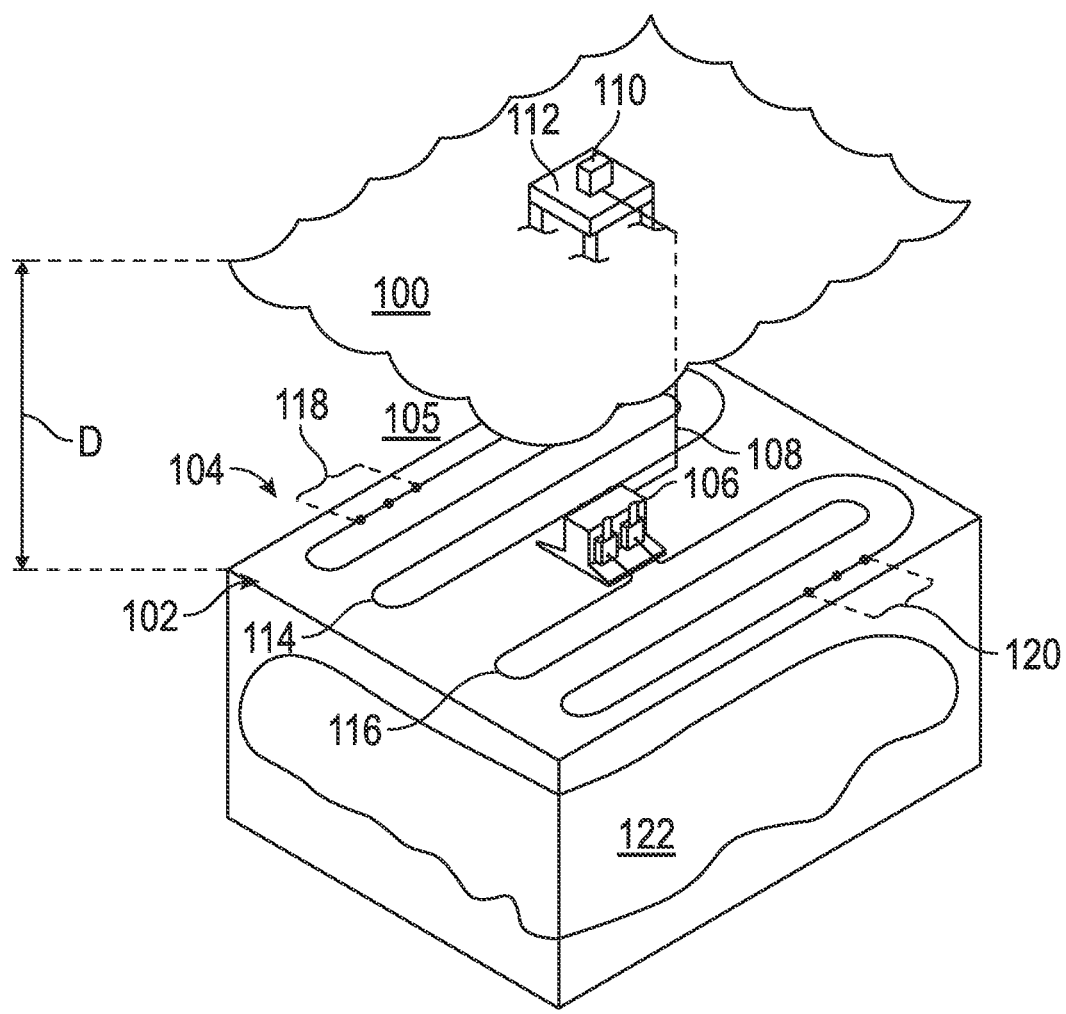
FIG. 1 shows a perspective cut-away view of a hydrocarbon reservoir monitoring system in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Marine environment" shall mean an underwater location regardless of the salinity of the water. Thus, even an underwater location in a body of fresh water shall be considered a marine environment.

"Sea floor" shall mean the boundary of a body of water and the underlying sediment or rock. The term sea floor shall not imply anything regarding the salinity of the water, and thus even the boundary of a body of fresh water and the underlying sediment or rock shall be considered a sea floor.

"Surface" in relation to the location of a physical object shall mean any location 100 feet below mean sea level and above.

"About" as used herein in conjunction with a numerical value shall mean the recited numerical value as may be determined accounting for generally accepted variation in measurement, manufacture and the like in the relevant industry.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

The various example devices and methods are directed to components of permanent hydrocarbon reservoir monitoring systems used in marine environments (e.g., in the range of 1000 meters of water depth). Permanent in this context indicating that the example systems can be used in reservoir monitoring where the various devices for monitoring are left on the sea floor indefinitely; however, the example systems can be used in any reservoir monitoring context. More particularly still, at least some of the various embodiments are directed to optical-based permanent reservoir monitoring in marine environments. The specification first turns to an illustrative system to orient the reader, and then to specifics regarding devices employed in conjunction with such a system.

FIG. 1 shows a perspective cut-away view of a portion of a marine environment comprising a permanent reservoir monitoring system in accordance with at least some embodiments. In particular, FIG. 1 shows the surface 100 of the water. At a distance D below the surface 100 resides the sea floor 102, and below the sea floor 102 resides a hydrocarbon reservoir 122.

Within the environment of FIG. 1 resides an example reservoir monitoring system 104. In some cases, reservoir monitoring system 104 is installed and remains in place for an extended period of time, and thus may be considered a "permanent" reservoir monitoring system. The example reservoir monitoring system 104 comprises a base unit 106 installed on the sea floor 102. The base unit mechanically and communicatively couples to an umbilical cable 108 that extends from the base unit 106, through water body 105, to a computer system at the surface. In the example system of FIG. 1, the computer system 110 may reside on a vessel 112 floating on the surface 100. The vessel 112 is illustratively shown as a floating platform, but other surface vessels may be used (e.g., ships, barges, or platforms anchored or mounted to the sea floor). By way of the umbilical cable 108, the base unit 106, as well as the various sensor cables discussed more below, are communicatively coupled to the computer system 110.

A reservoir monitoring system may comprise at least one sensor cable, and in the example system of FIG. 1 the reservoir monitoring system 104 comprises two sensor cables 114 and 116. In the system of FIG. 1, each sensor cable 114, 116 mechanically and communicatively couples to the base unit 106 on each end for redundancy of communication, in case of a communicative break along the sensor cable. The length of the sensor cables 114, 116 may vary depending upon the particular situation, and the length of sensor cables coupled to a base unit need not be the same. For example, in one situation a loop of sensor cable (e.g., sensor cable 114) may be on the order of 19 kilometers (km) in length, while another loop of sensor cable (e.g., sensor cable 116) may be on the order of 50 km.

Each sensor cable 114, 116 may comprise a plurality of seismic measurement devices, such as sensor devices 118 associated with sensor cable 114, and sensor devices 120 associated with sensor cable 116. While only three devices 118 are shown associated with sensor cable 114, in practice many hundreds or thousands of such sensor devices may be spaced along the sensor cable 114. Likewise, while only three sensor devices 120 are shown associated with sensor cable 114, in practice many hundreds or thousands of such sensor devices may be placed along the sensor cable 116. The sensor devices 118 and 120 need not, however, be evenly spaced along the sensor cables 114 or 116, and extended portions of the sensor cables may be without sensor devices. For example, lead-in portions of the sensor cable may have long expanses (e.g., multiple kilometers) within which no sensor devices are located.

The embodiments illustrated and discussed in the current specification herein are developed in the context of an optical system—with no electrical current flowing along the umbilical cable 108 and/or the sensor cables 114, 116. Persons having ordinary skill will understand that the system described and claimed is not limited to optical-only systems, and mixed optical and electrical systems may be implemented in conformance with aspects of this disclosure. The sensor devices may take any suitable form. For example, the sensor devices may be single-axis geophones, which measure minute changes in velocity. In some cases, the single-axis geophones may be gimbaled such that the geophones measure only vertical (i.e., aligned with the force of gravity) changes in velocity. In yet still other cases, the geophones may be three-axis geophones, which measure changes in velocity in all three spatial dimensions. In other cases, the sensor devices may be hydrophones which measure pressure or sound. In still other cases, multiple different kinds of sensor devices may be used in the same cable, including hydrophones and geophones. In some cases, the geophones and/or hydrophones may be passive optical devices, meaning the geophones and/or hydrophones are powered by optical energy conveyed along one or more optical fibers, and likewise modulate recorded data in the form of light along the same or different optical fibers in response to seismic, acoustic or other signals impinging on the sensor devices. As described above, the data may be communicated to computer system 110. The optical signals may be demodulated to retrieve the recorded data for further processing by computer system 110, or, alternatively, by a data processing system onshore. As described further below, in at least some embodiments, optical energy may be split or divided between the sensor devices, or between optical fibers in the sensor cables 114, 116 and/or umbilical 108. Thus, such splitting of optical energy may divide the optical energy delivering power to the sensor devices, for example. As would be appreciated by those skilled in the art having the benefit of the disclosure, optical signal and/or power splitting/combining in a passive seismic monitoring system may be accomplished using optical splitters/combiners or branching devices. Exemplary fabrication techniques include fused biconic taper (FBT) and planar lightguide circuits (PLC). The principles of the disclosure may be practiced with either fabrication technology and packaging technology.

Figure 2:
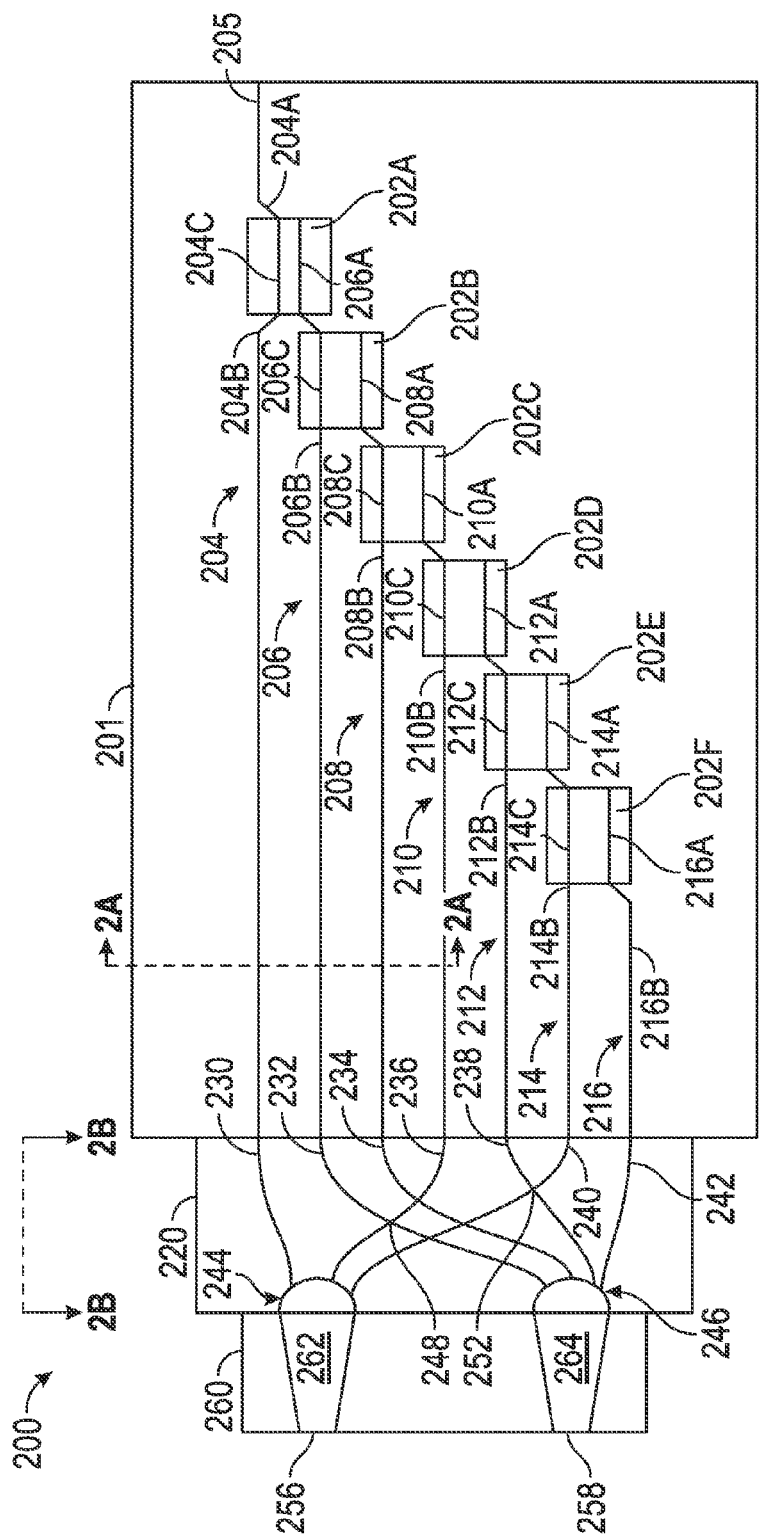
FIG. 2 shows an elevation view of a branching device in accordance with at least some embodiments.

Refer now to FIG. 2, illustrating a functional block diagram of a branching device 200 having a variable selectable splitting ratio in accordance with at least some embodiments. Branching device 200 may be used in conjunction with a reservoir monitoring system as described above, and in any other application where a selectable splitting ratio is desired. Branching device 200 includes an optical divider 201 and a combiner 220 described further below. Optical divider 201 includes a plurality of optical couplers 202A-202F. Optical divider 201 may also comprise a plurality of optical fiber waveguides 204, 206, 208, 210, 212, 214 and 216. Hereinafter optical fiber waveguides may simply be referred to as optical fibers. Optical couplers 202A-202F may be either FBT or integrated PLC optical couplers, either individual or on a single substrate for example. As described further below, each optical coupler 202A-202F may couple, in pairwise fashion, a fraction, for example 50%, of an optical energy in a first optical fiber of a pair of optical fibers to a second optical fiber of the pair. Optical energy may be input to optical divider 201 at end 205 of optical fiber 204, which, for example, may be coupled to an optical fiber conveying optical energy in conjunction with a reservoir monitoring system.

In at least some embodiments, optical fibers 204-216 may be integrated in the optical couplers. For example, each optical coupler 202A-202F may comprise segments of a pair of optical fibers disposed substantially parallel and adjacent to each other in spaced-apart fashion wherein a fraction of the optical energy flowing in a first optical fiber of the pair is coupled into the second optical fiber of the pair. For example, an optical field within a segment of the first optical fiber may extend outside of an outer surface of the optical fiber. The optical field outside of the optical fiber may exponentially decay in amplitude with increasing distance from the outer surface of the optical fiber. Thus, by choice of a distance between the segments of the optical fibers within the couplers, for example, segments 204C, 206A in optical coupler 202A, say, a desired fraction of optical energy may be may be coupled from the first optical fiber to the second optical fiber.

Further, another segment of each of optical fibers 206-212 may be disposed within and through a second one of the couplers 202A-202F. Thus, with respect to optical fibers 206-212 another fraction, 50% say, of the optical energy flowing in a second segment of one of a pair of optical fibers is coupled to a second optical fiber of the pair such that optical energy cascades down a chain of branches of optical divider 201. Thus, in the exemplary optical divider 201, optical fibers 204 and 206 are disposed within and through optical coupler 202A. Similarly optical fibers 206 and 208 are disposed within and through optical coupler 202B; optical fibers 208 and 210 in and through optical coupler 202C; optical fibers 210 and 212 in and through optical coupler 202D; optical fibers 212 and 214 in and through optical coupler 202E; and optical fibers 214 and 216 in and through optical coupler 202F. Because of the coupling of optical energy between pairs of optical fibers, the optical energy flowing in contiguous segments of each optical fiber varies even though the optical fibers may be continuous. Thus, for example if the relative optical energy in a first segment 204A of optical fiber 204 is taken to be 100%, the optical energy in a second segment, 204B may be diminished by the fraction of optical energy coupled into optical fiber 206 via optical coupler 202A. Optical coupler 202A may comprise a third segment 204C of optical fiber 204 and a first segment 206A of optical fiber 206 disposed, in a spaced-apart relationship having a distance therebetween, and substantially parallel and adjacent to each other, as previously described. A fraction of optical energy coupled from optical fiber 204 to optical fiber 206 via optical coupler 202A may be based upon the distance between segment 204C and segment 206A, also described above. If for example, one-half of the optical energy in segment 204A is coupled via segment 204C to optical fiber 206 then the relative optical energy in segment 204B is 50%. The remaining 50% of the optical energy is coupled into segment 206A of optical fiber 206 via optical coupler 202A. Further, in passing through optical coupler 202B, segment 206C of optical fiber 206 may couple a fraction of the optical energy in segment 206A to optical fiber 208. Again, by way of example, if one-half of the optical energy in segment 206A of optical fiber 206 is coupled to optical fiber 208, then the relative optical energy in segment 206B may be 25%, and the relative optical energy coupled into segment 208A may be 25%. Continuing in this way, if, for example, one-half of the optical energy coupled into segment 208A, about 12.5%, is coupled from via segment 208C in optical coupler 202C to optical fiber 210, the relative optical energy in segment 208B is 12.5% and the remaining optical energy of 12.5% is coupled into segment 210A of optical fiber 210. A relative optical energy of about 6% may be obtained in segment 210B of optical fiber 210 by coupling 50% of the optical energy in segment 206A, via optical coupler 202D and segment 210C of optical fiber 210, to segment 212A of optical fiber 212. Similarly, a relative optical energy of about 3% in segment 212B of optical fiber 212 may be obtained by coupling one-half of the optical energy in segment 212A to optical fiber 214 via optical coupler 202E and segment 212C of optical fiber 212. Coupling one-half of the optical energy coupled into segment 214A of optical fiber 214 via optical coupler 202E to optical fiber 216, via optical coupler 202F, segment 214C of optical fiber 214 and segment 216A of optical fiber 216, yields a relative optical energy of about 1.5% in each of segment 214B of optical fiber 214 and segment 216B of optical fiber 216. Thus, segments 204B-216B each form a branch of branching device 200. In this way, a set of power taps may be provided by the respective branches of the optical fibers 204-216, each branch corresponding to an relative optical energy level of about ½", n=1, . . . , 7, of an optical energy input into optical divider 201 at segment 204A of optical fiber 204.

Figure 2A:
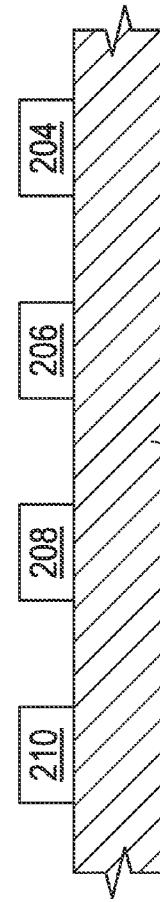
FIG. 2A shows an elevation view of a portion of an optical branching device in accordance with some embodiments.

Optical divider 201 may be an integrated device in which optical fibers 204-216 and optical couplers 202A-202F may comprise an optically transmissive dielectric material disposed on a substrate material such as silicon, ceramics, glass, plastics, for example polymethylmythacrylate (PMMA) or PCB materials. In such an embodiment, optical fibers 204-216 may be imprinted onto the substrate using masking and deposition techniques analogous to the manufacturing of semiconductor devices. FIG. 2A shows a portion of a substrate 218 having optical fibers disposed thereon. In FIG. 2A only four optical fibers are shown for simplicity. In at least some embodiments a cladding material (not shown in FIG. 2A) may be disposed about optical fibers 204-210 and on the surface of substrate 218.

An optical combiner 220 may combine the optical energy in each of the post-coupler segments, segments 204B-216B, of the respective optical fibers 204-216 to provide various split ratios of the optical energy output by branching device 200. In the exemplary embodiment described above in which about 50% of the optical energy in each of the source optical fibers is coupled in each optical coupler, all possible split ratios from zero percent to 100% may be obtained. As described further below, a first set of post-coupler segments of each of optical fibers 204-216 may be coupled to one of two outputs of optical combiner 220 based on the relative optical energy in each post-coupler segment. A second set of post-coupler segments of the optical fibers may be coupled, based on the relative optical energy in each segment, to a second one of two outputs of optical combiner 220. Optical combiner 220 may be disposed on a substrate similarly to optical divider 201.

Optical combiner 220 includes optical fibers 230, 232, 234, 236, 238, 240 and 242. Optical fibers 230-242 couple post-coupler segments, segments 204B-216B, to one of output coupler 244 and output coupler 246. Output couplers 244 and 246 may comprise first and second outputs of optical combiner 220. The coupling of selected post-coupler segments of each optical fiber 204-216 via optical fibers 230-242 may be based on a relative optical energy in each of the post-coupler segments 204B-216B. As previously described, the relative optical energy may, in turn, be determined by the fraction of optical energy coupled from the first to second optical fiber in each optical coupler 202B-202F. Output couplers 244 and 246 may, in at least some embodiments comprise multimode interference couplers. However, any suitable coupler architecture may be used. For example, in at least some alternative embodiments, an arrayed waveguide grating (AWG) may be used in output couplers 244, 246.

Figure 2B:
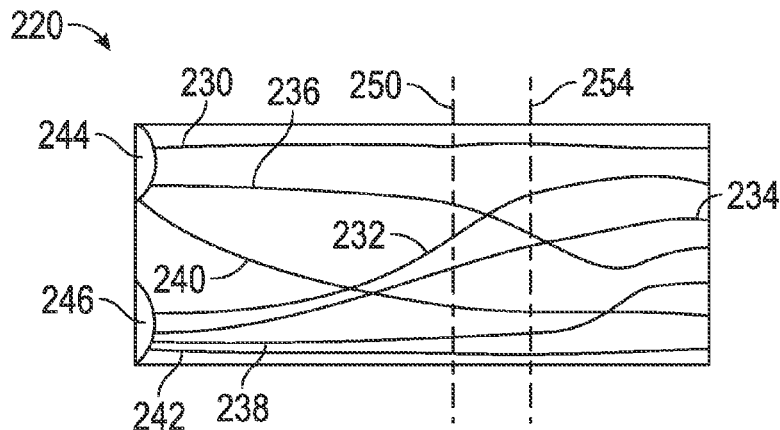
FIG. 2B shows a top view of a portion of the optical branching device of FIG. 2 in accordance with at least some embodiments.

In the elevation view of FIG. 2, optical fibers 238-242 appear to cross in traversing optical combiner 220. However, the optical fibers may be spatially separated from each other to avoid crossings by displacing them in the plane perpendicular to the plane of FIG. 2. For example, considering a top view of optical combiner 220 as shown in FIG. 2B, optical fibers 230-242 may be disposed in a spaced apart relationship across a depth, as referenced with respect to the plane of FIG. 2, of optical combiner 220. Thus, the apparent crossings of the optical fibers in FIG. 2, may be positioned such that the optical fibers are spaced apart in the plane perpendicular to FIG. 2. For example, the apparent crossing 248 of optical fibers 232 and 236 may be positioned such that optical fiber 232 and optical fiber 236 are spaced apart in the plane perpendicular to the plane of FIG. 2 as indicated by axis 250, FIG. 2B. In another example, the apparent crossing 252 of optical fibers 238 and 240 in FIG. 2 may be positioned such that optical fibers 238 and 240 are similarly spaced apart as shown by axis 254, FIG. 2B. Thus, stated otherwise, by appropriately laying out optical fibers 230-242 within a volume of optical combiner 220, crossings of the optical fibers may be avoided.

By selectably coupling a first set of optical fibers 230-242 to one of output couplers 244 and 246, and a second set of optical fibers 230-242 to the other of output couplers 244 and 246 a preselected power ratio R between 0% and 100% may be obtained at one output port of branching device 200 and a power ratio 100%—R at the other. The members of the first set may be mutually exclusive of the members of the second set. By way of example, optical fibers 230, 236 and 240 are connected between output coupler 244 and segments 204B, 210B and 214B, respectively, wherein optical fibers 204, 210 and 214 comprise members of an exemplary subset of optical fibers 204-216, coupled to output coupler 244. Summing the relative optical energy in segments 204B, 210B and 214B, about 50%, 6% and 3%, respectively, yields a power ratio, R, at output coupler 244 of 59%. Optical fibers 232, 234, 238 and 242 are connected between output coupler 246 and segments 206B, 208B, 212B and 216B, respectively, wherein optical fibers 206, 208 and 212 and 216 comprise members of another exemplary subset of optical fibers 204-216, coupled to output coupler 246. Summing the relative optical energy in segments 206B, 208B, 212B and 216B, about 25%, 12.5%, 3% and 1% gives a power ratio at output coupler 246 of about 41%. It would be readily appreciated by those skilled in the art having the benefit of the disclosure that by selecting different arrangements of the sets of optical fibers coupled between each of output couplers 244 and 246 and segments 204B-216B of optical fibers 204-216 any desired optical energy split ratio may be obtained. Similar to optical divider 201, in at least some embodiments, optical combiner 220 may be an integrated device in which optical fibers 230-242 may comprise a dielectric material, such as an optical polymer disposed on a substrate. Suitable substrates include semiconductors such as silicon, ceramics, glass, plastic or PCB materials. In some embodiments, optical combiner 220 and optical divider 201 may comprise a monolithic device.

The optical energy output from each of the output couplers 244 and 246 may be focused on respective output ports 256 and 258 by double waveguide taper 260. Double waveguide taper 260 may also be monolithic with optical divider 201 and optical combiner 220 wherein branching device comprises an integrated monolithic device. Double waveguide taper 260 may comprise a micro-lens or a molded dual index polymer material, similar to an athermal arrayed-waveguide grating (AWG). In at least some embodiments, double waveguide taper 260 may also comprise a pair of adiabatic taper waveguides 262 and 264, which may be, for example, disposed on silicon-on-insulator (SOI) substrate. Branching device 200 may be coupled into sensor cable 114 or 116 comprising one or more optical fibers. For example, a V-groove fiber attach chip (not shown in FIG. 2) may be used to interface output ports 256 and 258 to optical fibers within a sensor cable 114 or 116. In this way, for example, optical energy may be split among optical fibers in a sensor cable 114 or 116 to supply optical power to different branches in an array of sensor devices 118, 120.

Figure 3:
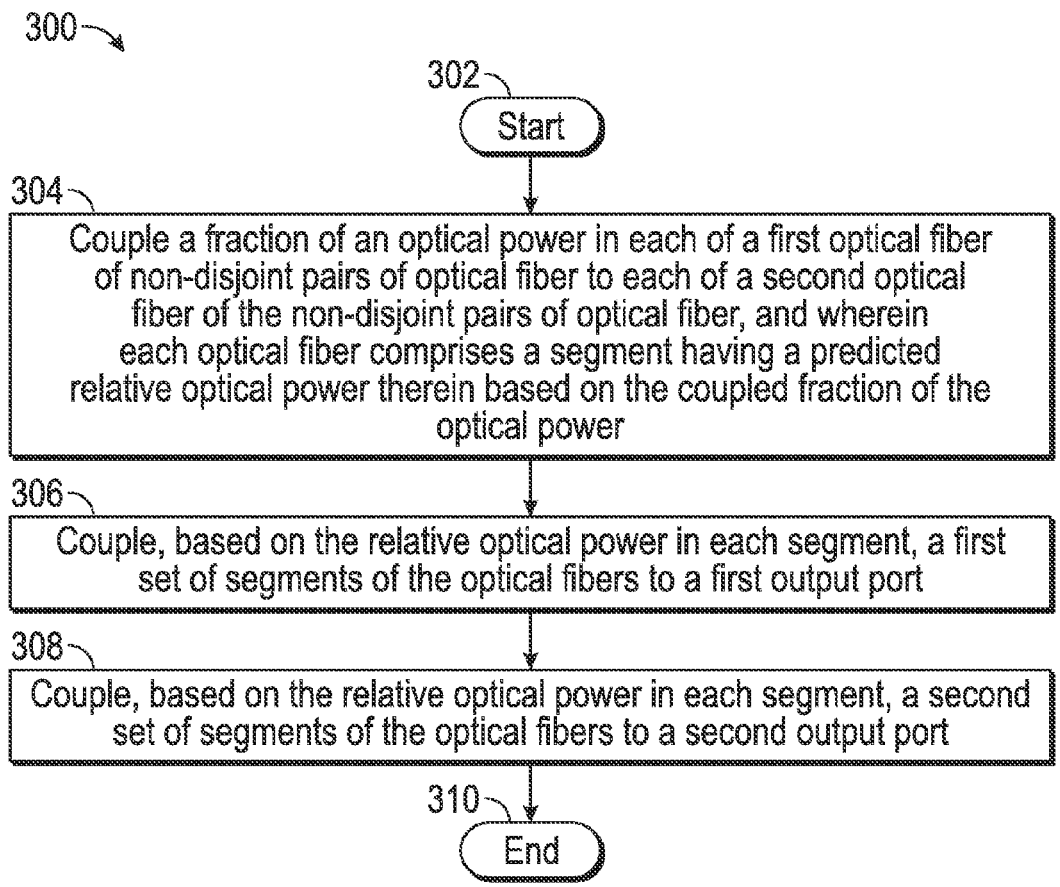
FIG. 3 shows a flow chart of a method in accordance with at least some embodiments.

To further appreciate the principles of the disclosure, refer now to FIG. 3 showing a flow chart of a method 300 in accordance with at least some embodiments. Method 300 starts at block 302. In block 304, a fraction of an optical energy in each of a first optical fiber of non-disjoint pairs of optical fibers is coupled to each of a second optical fiber of the non-disjoint pairs of optical fibers. Each optical fiber comprises a segment having a relative optical energy therein based on the coupled fraction of the optical energy. For example, in the embodiment of a branching device shown in FIG. 2, each of the optical fibers is associated in pair-wise fashion via optical couplers 204A-204F. Further, each of optical fibers 206-212 are doubly pair-wise associated. Stated otherwise, each of these optical fibers are associated with two other optical fibers; as an energy "sink" for one of the other two optical fibers and as a "source" for the second of the other two optical fibers. In this way, optical energy may cascade through branching device 200 as previously described, and each of optical fibers 204-216 may be members of non-disjoint optical fiber pairs; the optical fiber pairs being non-disjoint because of the common optical fiber, i.e. each of optical fibers 206-216, shared between the non-disjoint pairs. In other words, the fraction of the optical energy may be successively coupled in each non-disjoint pair of optical fiber in which for a first set of pairs of optical fibers, the first optical fiber of the pair comprises a second optical fiber of a preceding pair of optical fibers. For a second set of pairs of optical fibers, the second optical fiber of the pair comprises a first optical fiber of a succeeding pair of optical fibers. Thus, optical energy cascades down branches of optical divider 201.

In block 306, a first set of segments of the optical fibers may be coupled, based on the relative optical energy in each segment, to a first output port. A second set of segments of the optical fibers may be coupled, based on the relative optical energy in each segment, to a second output port, block 308. For example, in an embodiment in which each optical fiber comprises an integrated optical fiber disposed on a substrate, the first output port may be coupled, based on the relative optical energy in each segment, to the first set of segments by disposing a first set of optical fibers on the substrate between the first set of segments and a first output coupler. Similarly, the second output port may be coupled, based on the relative optical energy in each segment, to the second set of segments by disposing a second set of optical fibers on the substrate between the second set of segments and a second output coupler. As described above, exemplary input and output couplers may include, by way of example, multimode interference couplers, arrayed waveguide gratings as well as 1×N FBT couplers. In at least some embodiments, the first and second output ports may be further coupled to the first and second output couplers, respectively, by first and second adiabatic taper waveguides. In this way, with the fraction of optical energy 50% all optical energy ratio splits between output ports may be obtained, as previously described. In this example embodiment, a first output port may have a relative optical energy from 0% to 100%, with the second output port having relative power that is the difference between 100% and the relative optical energy at the first output port, i.e. in the range of from 100% to 0%. Further, although the principles of the disclosure have been described in terms of a single input and two outputs, it would be appreciated by those skilled in the art having the benefit of the disclosure that the device may be scaled to embody any number, M, inputs and any number, N, outputs.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, portions of the branching device may be comprised of integrated structures while other portions may be fabricated as bulk structures. Further, in at least some embodiments, various packing methods may be used depending on the application. For example, in a subsea application, a pressure-balanced device may be provided by, for example, encapsulation of the device with a high Young's modulus epoxy or overmolding with a polymer such as HYTREL thermoplastic elastomer from DuPont or polyurethane. It is intended that the following claims be interpreted to embrace all such variations and modifications.

What is claimed is:

1. A device comprising:
    a substrate;
    an optical combiner disposed on the substrate;
    an optical divider disposed on the substrate, the optical divider comprising:
        a first optical coupler;
        a second optical coupler distinct from the first optical coupler;
        a third optical coupler distinct from the first and second optical couplers;
        a first optical fiber integrated in the first optical coupler, and the first optical fiber coupled to the optical combiner;
        a second optical fiber integrated in the first optical coupler and in the second optical coupler, the second optical fiber coupled to the optical combiner; and
        a third optical fiber integrated in the second optical coupler and in the third optical coupler, the third optical fiber coupled to the optical combiner;
    the optical combiner comprising:
        a first output coupler;
        a second output coupler distinct from the first output coupler;
        wherein:
            the optical combiner couples a first subset of the first through third optical fibers to the first output coupler; and
            the optical combiner couples a second subset of the first through third optical fibers to the second output coupler, members of the first subset mutually exclusive of members of the second subset.

2. The device of claim 1 wherein:
    the first optical coupler comprises a segment of the first optical fiber disposed in a spaced apart relationship and adjacent to a segment of the second optical fiber and having a distance therebetween, a fraction of optical energy coupled from the first optical fiber to the second optical fiber based upon the distance; and
    the second optical coupler comprises a segment of the second optical fiber disposed in a spaced apart relationship and adjacent to a segment of the third optical fiber and having a distance therebetween, the fraction of optical energy coupled from the second optical fiber to the third optical fiber based upon the distance.

3. The device of claim 2 wherein:
    for the first optical coupler, the fraction of optical energy coupled from the first optical fiber to the second optical is about fifty percent (50%); and
    for the second optical coupler the fraction of optical energy coupled from the second optical fiber to the third optical fiber is about 50%.

4. The device of claim 1 wherein the combiner further comprises:
    a first set of optical fibers comprising one or more optical fibers coupled to the first output coupler and the first subset of first through third optical fibers; and
    a second set of optical fibers comprising one or more optical fibers coupled to the second output coupler and the second subset of first through third optical fibers.

5. The device of claim 1 wherein:
    the first output coupler comprises a first multimode interference coupler; and
    the second output coupler comprises a second multimode interference coupler.

6. The device of claim 1 wherein:
    the first output coupler comprises a first arrayed waveguide grating (AWG); and
    the second output coupler comprises a second arrayed waveguide grating (AWG).

7. The device of claim 1 further comprising:
    a first adiabatic taper waveguide coupled to the first output coupler of the optical combiner; and
    a second adiabatic taper waveguide coupled to the second output coupler of the optical combiner.

8. The device of claim 1 wherein the each of the first, second and third optical fibers comprises a polymer.

9. The device of claim 7 wherein the substrate comprises silicon.

10. The device of claim 7 wherein the substrate comprises a plastic.

11. A method comprising:
    coupling a fraction of an optical energy in each of a first optical fiber of non-disjoint pairs of optical fibers to each of a second optical fiber of the non-disjoint pairs of optical fibers, and wherein each optical fiber comprises a segment having a relative optical energy therein based on the coupled fraction of the optical energy;
    coupling, based on the relative optical energy, a first set of segments of the optical fibers to a first output port; and
    coupling, based on the relative optical energy, a second set of segments of the optical fibers to a second output port.

12. The method of claim 11 wherein the fraction of the optical energy is about fifty percent (50%).

13. The method of claim 11 wherein the coupling to the first output port outputs a first optical energy ratio in the range of zero percent (0%) to one-hundred percent (100%) and the coupling to the second output port outputs a second optical energy ratio that is a difference of 100% and the first optical energy ratio.

14. The method of claim 11 wherein coupling the fraction of the optical energy comprises successively coupling the fraction in each non-disjoint pair of optical fibers, wherein:
    for a first set of pairs of optical fibers, the first optical fiber of the pair of optical fibers comprises a second optical fiber of a preceding pair of optical fibers, and
    for a second set of pairs of optical fibers, the second optical fiber of the pair comprises a first optical fiber of a succeeding pair of optical fibers.

15. The method of claim 14 wherein each optical fiber comprises an integrated optical fiber disposed on a substrate, and wherein:
    the coupling to the first output port comprises disposing a first set of optical fibers on the substrate between a first output coupler coupled to the first output port and the first set of segments; and
    the coupling to the second output port comprises disposing a set of optical fibers on the substrate between a second output coupler coupled to the second output port and the second set of segments.

16. The method of claim 15 wherein:
the first output port and the first output coupler are further coupled via a first adiabatic taper waveguide disposed on the substrate; and
the second output port and the second output coupler are further coupled via a second adiabatic taper waveguide disposed on the substrate.

17. The method of claim 15 wherein the first and second output couplers each comprise multimode interference couplers disposed on the substrate.

18. The method of claim 15 wherein the first and second output couplers each comprise arrayed waveguide gratings (AWGs) disposed on the substrate.

19. A system comprising:
a sensor cable comprising a first optical fiber configured to convey optical energy;
an optical combiner including:
a first output coupler; and
a second output coupler distinct from the first output coupler;
an optical divider comprising:
a first optical coupler;
a second optical coupler distinct from the first optical coupler;
a third optical coupler distinct from the first and second optical couplers;
a fourth optical coupler distinct from the first, second and third optical couplers;
a second optical fiber integrated in the first optical coupler, the second optical fiber coupled to the optical combiner and having an end coupled to the first optical fiber;
a third optical fiber integrated in the first optical coupler and in the second optical coupler, the third optical fiber coupled to the optical combiner, and having a portion of the optical energy in the second optical fiber coupled between the second and third optical fibers; and
a fourth optical fiber integrated in the second optical coupler and in the third optical coupler, the third optical fiber coupled to the optical combiner, and having a portion of the optical energy in the third optical fiber coupled between the third and fourth optical fibers;
a fifth optical fiber integrated in the third optical coupler and in the fourth optical coupler, the fifth optical fiber coupled to the optical combiner and having a portion of the optical energy in the fourth optical fiber coupled between the fourth and fifth optical fibers; wherein:
a first subset of the second through fifth optical fibers is coupled to the first output coupler of the optical combiner; and
a second subset of the second through fifth optical fibers to the second output coupler of the optical combiner, members of the second subset mutually exclusive of members of the first subset; and
a first sensor device coupled to the first output coupler; and
a second sensor device coupled to the second output coupler.

* * * * *